No. 607,972. Patented July 26, 1898.
L. VIGNAL.
DRIVING GEAR FOR BICYCLES.
(Application filed Sept. 21, 1897.)
(No Model.)

Witnesses:
E. B. Bolton
A. A. Kargl

Inventor:
Léon Vignal
By Richards
his Attorneys.

UNITED STATES PATENT OFFICE.

LEON VIGNAL, OF PARIS, FRANCE.

DRIVING-GEAR FOR BICYCLES.

SPECIFICATION forming part of Letters Patent No. 607,972, dated July 26, 1898.

Application filed September 21, 1897. Serial No. 652,477. (No model.)

*To all whom it may concern:*

Be it known that I, LEON VIGNAL, a citizen of the Republic of France, and a resident of Paris, France, have invented certain new and useful Improvements in Driving-Gear for Bicycles, of which the following is a specification.

This invention has for its object an improved method of transmitting movement in cycles by bevel-gearings by means of a shaft in two parts, the connection of these two parts forming a flexible arrangement capable of absorbing dynamic deformations, while leaving the gearings at their theoretical engagement.

The two parts of the bisected or divided transmission-shaft which I employ may be connected by any suitable means, and it is quite understood that the coupling by tenons and mortises with a central plug, the description of which is given hereinafter and which is one of the most practical forms, may be replaced by any suitable mechanical arrangement capable of fulfilling the same object.

The characteristic and essential point of my invention consists in the use of a suitable arrangement enabling the slight deformations which are produced in cycle-frames to be absorbed by the said arrangement or part. In a transmission by means of a rigid shaft arranged on a system subjected to forces such as those to which bevel-gear transmission for cycles is exposed the deformations are transmitted to the gearing in contact and increase the friction. In my improved arrangement these deformations are localized at a given point of the flexible part, and consequently the gearings always preserve their theoretic contact.

The transmission of movement is effected by means of four bevel-wheels, two of which are keyed, respectively, on the pedal-shaft and the axle of the rear wheel. Two others engage, respectively, with the first-mentioned two and are connected by a shaft broken at one point and connected by means of a sleeve with tenons and mortises, the utility of this interruption of the shaft having been indicated hereinbefore.

Figure 1:
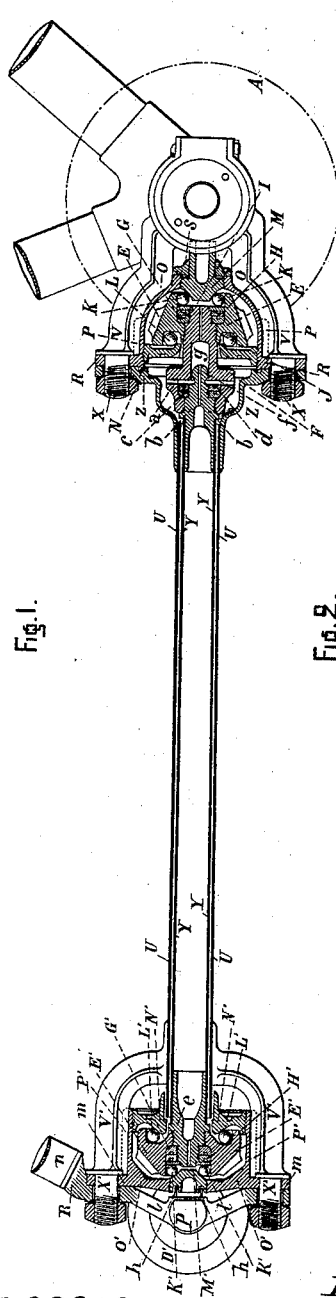
Figure 2:
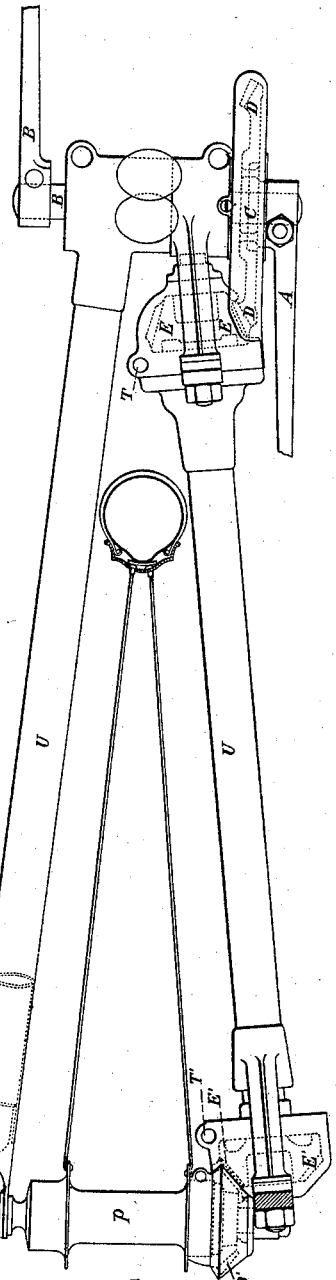

In the drawings, Figure 1 is a sectional view along one of the frame-tubes, driving-shaft, and gearing, showing parts in elevation. Fig. 2 is a plan view of the rear forks and attached mechanism with parts in section.

The movement is transmitted as in ordinary safety-bicycles by means of two cranks A B. The crank A has on its boss C a bevel-wheel D, (driving bevel-wheel,) and it is fixed like the crank B on the pedal-shaft by means of a key with washer and nut. The bevel-wheel D drives a bevel-wheel E, which is screwed on the part F of the coupling-sleeve bearing the mortises. The absolute fixture of the wheel E on the part F is further obtained by means of nuts and lock-nuts G H, on which rests a plate or race I for the traveling of the balls. The wheel E thus formed has two cups or races. That which is on the side of the pedal-shaft contains balls K and that in the rear of the side of the mortises balls L in a circular recess J. The wheel E with double cups bears by means of these balls on two cones M and N, which are screwed in the interior of a steel box O, having double ridges P, forming a groove between them, and attachment lugs or feet R. The wheel is thus held in front and behind. The power it has to transmit is exerted between the two points of support, and consequently it cannot have any tendency to reverse or to jam the teeth. The best conditions for realizing continuously a theoretical engagement are thus obtained. Further, the cup J is placed in such a way that its ring of balls are exactly at the point of contact of the primitive circles of the gearing—that is to say, at the point of application of the power to be transmitted—and consequently the resultant tangential of the power to be transmitted is destroyed.

The two cones M N when once fixed cannot be displaced. The small cone M, which is in front, is threaded to the left and fixed by a counter-nut S, threaded to the right. It fits into a little recess which is formed in the pedal-fork and which prevents it turning. The large cone N is fixed by a key T, which enters into a boss of the box O. These cones also serve for the adjustment, which, as may be seen, is very easily effected. It suffices to slightly turn the cones M N by means of a spanner in order to compensate for any wear of the balls or cones or even of the bevel-wheels.

The steel box O, which contains the whole

No. 607,973. Patented July 26, 1898.
H. W. WANAMAKER.
BRICK KILN.
(Application filed Jan. 20, 1898.)
(No Model.) 3 Sheets—Sheet 1.
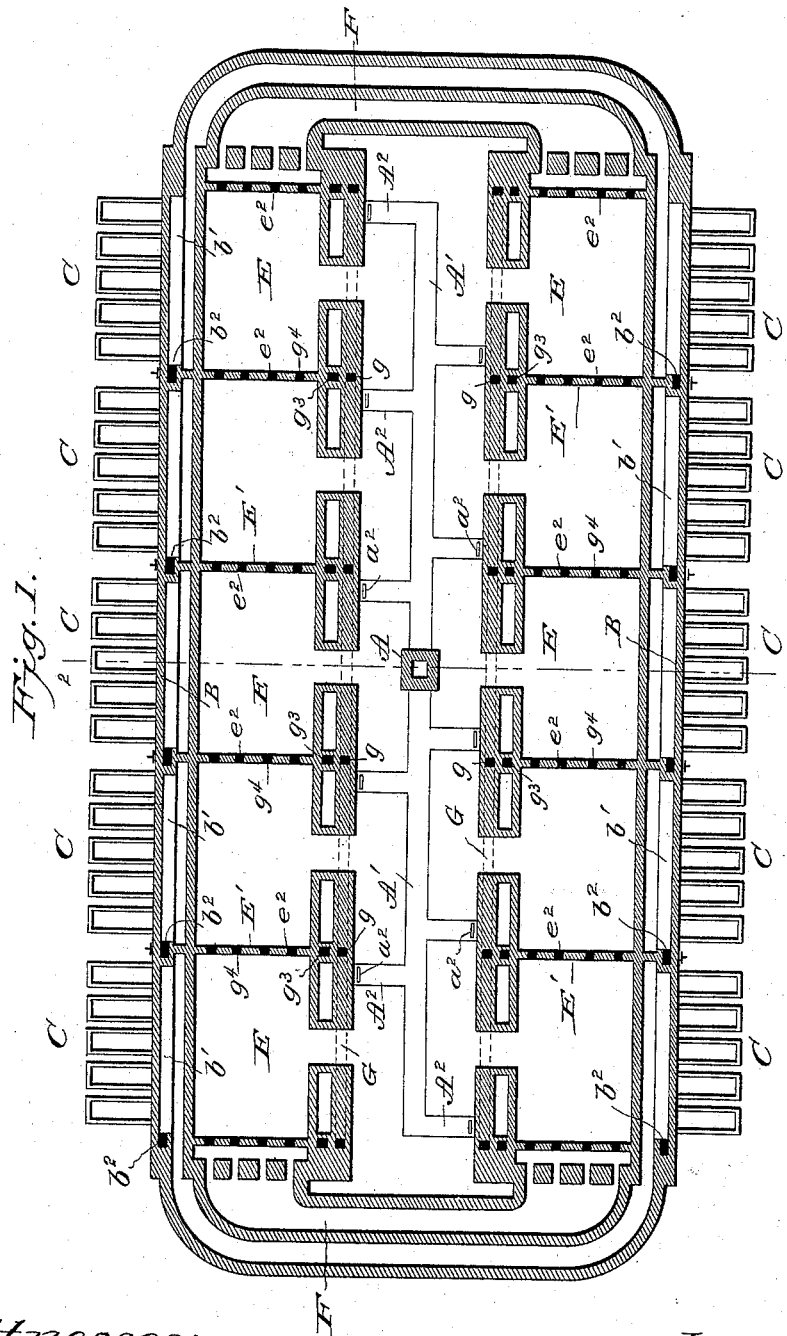
Witnesses:
L. S. Elliott.
R. C. Cassell
Inventor:
Henry W. Wanamaker,
by Eugene W. Johnson
his attorney